US007127037B2

(12) United States Patent
Bowen et al.

(10) Patent No.: US 7,127,037 B2
(45) Date of Patent: Oct. 24, 2006

(54) SOLLER SLIT USING LOW DENSITY MATERIALS

(75) Inventors: David Keith Bowen, Warwick (GB); Ladislav Pina, Praha (CZ); Adolf Inneman, Praha (CZ); Stephan Menzer, Wakefield (GB)

(73) Assignee: Bede Scientific Instruments Ltd., Durham (GB)

( * ) Notice: Subject to any disclaimer, the term of this patent is extended or adjusted under 35 U.S.C. 154(b) by 0 days.

(21) Appl. No.: 10/626,630

(22) Filed: Jul. 25, 2003

(65) Prior Publication Data

US 2004/0131147 A1 Jul. 8, 2004

Related U.S. Application Data

(60) Provisional application No. 60/398,584, filed on Jul. 26, 2002.

(51) Int. Cl.
*G21K 1/02* (2006.01)
*G01N 23/20* (2006.01)

(52) U.S. Cl. ........................ 378/149; 378/71; 378/147; 250/505.1

(58) Field of Classification Search .................. 378/34, 378/70, 71, 73, 84, 85, 147, 149, 154, 155; 250/505.1
See application file for complete search history.

(56) References Cited

U.S. PATENT DOCUMENTS 4,125,776 A * 11/1978 Tosswill et al. ............ 378/149
5,016,267 A * 5/1991 Wilkins ....................... 378/84
5,164,974 A * 11/1992 Kariya et al. ................. 378/34
5,231,655 A * 7/1993 Wei et al. .................... 378/147
5,263,075 A * 11/1993 McGann et al. ............ 378/147
5,373,544 A 12/1994 Goebel
5,389,473 A * 2/1995 Sokolov ........................ 430/4
5,455,849 A * 10/1995 Logan et al. ............... 378/154
5,744,813 A * 4/1998 Kumakhov .............. 250/505.1
5,970,118 A * 10/1999 Sokolov ...................... 378/155
6,108,401 A * 8/2000 Reefman ...................... 378/83
6,266,392 B1 * 7/2001 Fujinawa et al. ........... 378/149
6,307,917 B1 * 10/2001 Shimizu et al. ............. 378/145
6,353,227 B1 * 3/2002 Boxen ...................... 250/363.1
6,444,993 B1 * 9/2002 Kogan ...................... 250/505.1
6,494,618 B1 * 12/2002 Moulton ...................... 378/204
6,624,431 B1 * 9/2003 Foster et al. ............. 250/505.1
6,678,352 B1 * 1/2004 Kumakhov ................. 378/154
6,881,965 B1 * 4/2005 Bowen et al. ........... 250/492.2
2004/0089818 A1 * 5/2004 Bowen et al. ........... 250/492.2

FOREIGN PATENT DOCUMENTS

EP 0354605 A2 2/1990

OTHER PUBLICATIONS

H. H. Otto and W. Hofmann, J. Appl. Cryst. 29, 495-497 (1996).*

(Continued)

*Primary Examiner*—Allen C. Ho
(74) *Attorney, Agent, or Firm*—Buchanan Ingersoll & Rooney, PC

(57) ABSTRACT

A Soller slit device is provided for collimation of high energy radiation, such as X-ray or EUV radiation, and has a low angle of divergence (less than 0.1°) and a high transmission efficiency (60 to 80% or greater). The Soller slit is made up of multiple, parallel blades of low-density material, such as glass, mica, or the like, which can be treated to reduce reflectivity. The Soller slit device of the invention advantageously provides an increased peak intensity and decreased peak width in diffraction patterns produced in high energy diffractometry applications, such as X-ray diffractometry.

21 Claims, 2 Drawing Sheets

OTHER PUBLICATIONS

B. D. Cullity, Elements of X-Ray Diffraction, second edition (Reading, MA: Addison-Wesley, 1978), p. 196-199.*

Fahrig et al., "Performance of glass fiber antiscatter devices at mammographic energies", Med. Phys. 21, 1277-1282 (1994).*

* cited by examiner

SOLLER SLIT USING LOW DENSITY MATERIALS

This disclosure claims priority under 35 U.S.C. § 119(e) to U.S. Provisional Application No. 60/398,584 entitled Soller Slit Using Low Density Materials, filed on Jul. 26, 2002, the entire content of which is hereby incorporated by reference.

FIELD OF THE INVENTION

The present invention relates to X-ray metrology. Specifically, the invention relates to a device for controlling the divergence of a beam of X-rays.

BACKGROUND OF THE INVENTION

Various technologies make use of high energy radiation, such as X-ray and extreme ultraviolet (EUV) radiation. Because of the nature of this type of radiation, it is often difficult to control its divergence. One common optical element that is used to control the divergence of an X-ray beam is a collimator commonly called a Soller slit. Soller slits generally comprise an array of parallel, or nearly parallel, plates or blades that limit the divergence of an X-ray beam by simple blocking or absorption of divergent rays, which restrict the rays so that they only pass through an open section of the array.

Soller slit devices for collimation of X-rays and other high energy radiation have a variety of commercial applications. One such application that employs a Soller slit as an X-ray collimator is X-ray diffractometry. Some examples of elements measured by way of X-ray diffractometry include pharmaceutical pills, powder within capillaries, and powder between plates. X-ray diffractometry can make use of either transmissive or reflective measurements of incident X-rays.

X-ray diffractometry is the most widely used form of X-ray diffraction in the world. Thus, Soller slits that can be used for X-ray diffractometry are highly desirable for commercial diffractometry applications. Many devices using traditional Soller slits have already been developed for X-ray diffractometry.

Because X-ray diffractometry produces and requires measuring a weak signal, the diffracted X-ray signal is conventionally measured over a long period of time, typically several hours. Therefore, an increase in transmission efficiency of the X-ray optics (e.g., a Soller slit device) would be advantageous, as processing time could be greatly reduced due to stronger incident radiation, which in turn produces a proportionally stronger diffracted signal.

One problem generally associated with Soller slit devices used for commercial applications such as X-ray diffractometry, however, is that they generally have relatively low transmission efficiencies and large divergence angles. For example, a typical Soller slit device may have a transmission efficiency of 30% or less. Thus, well over half of the X-ray radiation incident upon the device is lost and unusable for measurements in the application in which the Soller slit is being employed. Additionally, typical divergence angles for known Soller slit devices generally range from 0.2° to 0.8°. This typical divergence angle is large, and negatively impacts the Soller slit's ability to effectively collimate x-ray radiation for commercial applications such as X-ray diffractometry.

It has been generally thought that materials of high density, such as dense metals (e.g., molybdenum or brass) were needed in Soller slits, to provide adequate absorption for the high energy divergent X-rays. As a result, the blades of Soller slits have traditionally been made out of sheets of heavy, or highly absorbing metal. Although these metal sheets can be made extremely thin, the mechanical stability of such thin sheets is not sufficient for high precision X-ray applications. For example, any curling or rumpling of the sheets, which is common with metals, will result in poor transmission through the Soller slit device, and consequently unpredictable divergence.

Consequently, metal-foil Soller slits have been made with relatively thick foils (e.g., on the order of 250 μm). These metal foil devices yield relatively low transmission efficiencies. Moreover, the transmission efficiencies of such devices diminishes as the required divergence is reduced (i.e., the quality of such devices' outputs becomes worse as their design constraints are made more restrictive).

European Patent No. EP 0354605 B1 discloses a Soller slit X-ray collimator made from a ceramic material containing heavy elements, e.g., a ceramic of lead titanate with a lead content over 60%. The production of the Soller slit described therein requires expensive ceramic materials processing, and is therefore less desirable for commercial applications.

Accordingly, it is desirable to produce blades of a Soller slit from a material that provides adequate absorption of diverging X-rays, without the problems associated with prior devices, such as those made from heavy metals. Specifically, it is desirable to provide a Soller slit device that utilizes materials that are resistant to bending, as is the case with traditional metal blades. To this end, it is desirable to provide a Soller slit that makes use of relatively low density materials. Additionally, it is desirable to produce a Soller slit device having blades with a thinner profile than conventionally used metal blades or metal foil blades, to provide a better transmission efficiency for the device. It is desirable to provide such an increase in transmission efficiency, while maintaining a low divergence angle. Additionally, it is desirable to provide a Soller slit X-ray collimator that provides the above objectives, while being relatively inexpensive to produce, to ensure that commercial advantages are maintained.

Furthermore, it is desirable to provide an X-ray diffractometer, or diffractometry system, utilizing a Soller slit comprising the above-mentioned low density materials. Specifically, it is desirable to provide a system for performing high energy radiation diffractometry, which makes use of increased transmission efficiency and low divergence angle of such a Soller slit.

SUMMARY OF THE INVENTION

In accordance with the present invention, the foregoing objectives are achieved by way of an X-ray Soller slit collimating device that uses lightweight, low density materials that are relatively inexpensive. The Soller slit device of the present invention provides an increased transmission throughput efficiency of at least 60%, and more preferably 80%, while maintaining a low divergence of less than 0.1°.

The present invention provides a Soller slit device whose blades are made of low density materials. Some examples of low density materials that can be used for the blades of the Soller slit of the present invention include glass and mica. Advantageously, by making Soller slit devices from such low density materials, the blades of the devices of the invention can be made much thinner than traditional Soller slit blades. For example, in accordance with an embodiment of the present invention, glass blades that are on the order of 50 μm in thickness may be used. Such thin blades allows for increases in the throughput efficiency of the Soller slit device.

Additionally, the blades of the Soller slit device of the present invention can be produced in longer lengths than conventional devices, which decreases the angle of divergence of the beam transmitted through the device. These longer lengths are feasible because the blades of the present invention are more resistant to bending than the metal blades of prior devices. In accordance with an embodiment of the present invention, the angle of divergence of the Soller slit device may be less than 0.1°.

The longer length of the blades facilitates the use of lower density materials to construct the blades. This is because divergent X-rays that exceed the divergence angle of the Soller slit device of the present invention (e.g., greater than 0.1°) strike the blades of the Soller slit device at an oblique angle that effectively magnifies the absorption capability of each blade by a large factor. For example, in accordance with an embodiment of the present invention, each blade's absorption ability may be effectively multiplied by a factor of about 600. Due to this large absorption factor, glass, mica, and other low density materials provide adequate absorption for divergent high energy radiation, including X-rays.

The present invention also provides for a system for X-ray, or other high radiation, diffractometry which makes use of the Soller slit described above. Specifically, the system for diffractometry provided by the present invention allows for the use of a Soller slit as a collimation element. The radiation collimating device reduces divergence, while providing increased transmission efficiency. Specifically, transmission efficiency of the Soller slit used by the system for diffractometry allows for a transmission efficiency of at least 60% and preferably approximately 80%, while maintaining a divergence of less than 0.1°. This can be accomplished by using a Soller slit manufactured from relatively low density materials.

The foregoing features of the invention, and the advantages achieved thereby, are explained in greater detail hereinafter with reference to particular embodiments illustrated in the accompanying drawings.

DETAILED DESCRIPTION OF THE INVENTION

To facilitate an understanding of the principles that underlie the present invention, it will be described hereinafter with particular reference to embodiments thereof, and specific applications wherein it is used. It will be appreciated, however, that the practical applications of the invention are not limited to the particular embodiments described herein. Rather, the invention will find utility in a variety of different applications wherein a Soller slit X-ray collimator having a high transmission throughput efficiency and/or a low divergence is desirable. The present invention provides commercial advantages for multiple applications, as the Soller slit device of the present invention provides a greater transmission efficiency and a lower divergence angle than those associated with traditional optics used in high energy radiation applications, such as X-ray diffractometry.

Figure 1:
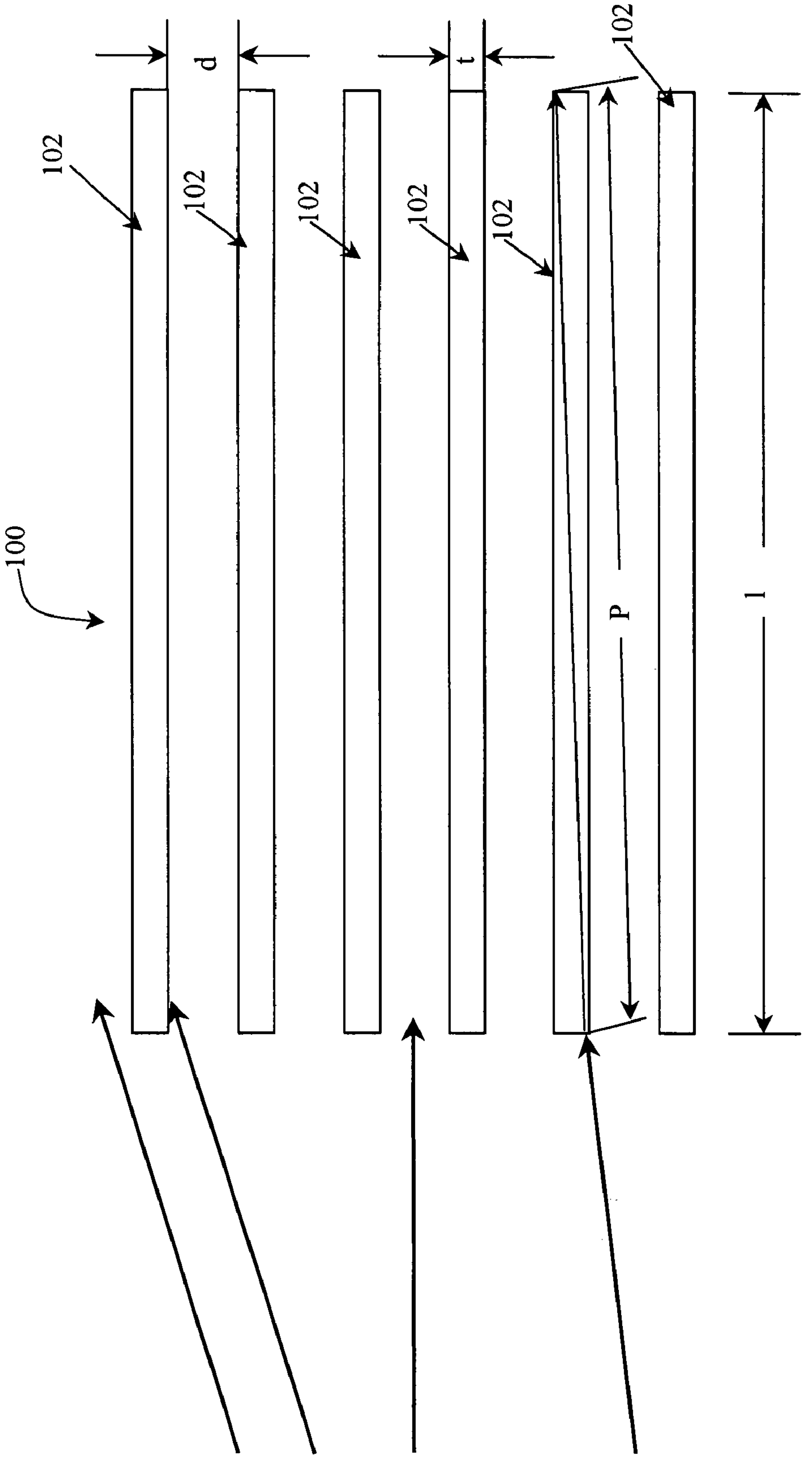
FIG. 1 is a diagram of a first embodiment of Soller slit collimator in accordance with the present invention.

FIG. 1 illustrates a Soller slit device 100. The Soller slit device is made up of multiple parallel blades 102. Although only a limited number of blades are shown in FIG. 1, it will be appreciated by those skilled in the art that the Soller slit device 100 could be made up of a greater number of blades. The actual number of blades to be employed will be dependent upon factors such as the width of the beam to be collimated, and the thickness and spacing of the blades, discussed hereinafter.

To the left of the Soller slit device are shown several X-rays, represented by long arrows. The Soller slit X-ray collimator device 100 operates by preventing the divergent X-rays (e.g., X-rays radiating in the direction of the top two illustrated X-rays) from passing through the Soller slit, while allowing the non-diverging X-rays (e.g., the third X-ray down) to pass through the Soller slit device 100. Thus, multiple X-rays may be incident on the Soller slit device 100, and only those that are parallel, or nearly parallel with (i.e., slightly divergent from) the blades of the Soller slit device will pass through. All divergent X-rays, on the other hand, will be absorbed by the blades 102.

The key performance parameters of a Soller slit device 100 are its divergence and transmission efficiency. Theoretical divergence of any Soller slit device 100 is given by Equation 1 below:

$$\Delta\theta = \frac{2d}{l} \tag{1}$$

where $\Delta\theta$ is the theoretical divergence angle of the Soller slit device 100, d is the spacing between blades 102 of the Soller slit device 100, and l is the length of each blade 102 of the Soller slit device 100. It should be noted, however, that the divergence described in Equation 1 is only theoretical, and that divergence may be worse for Soller slit devices that have manufacturing defects. Thus, a Soller slit device having blades that are not correctly spaced, or properly aligned, for example, may have a divergence that is greater (i.e., worse for most applications) than the divergence calculated pursuant to Equation 1 above.

Transmission efficiency can be calculated according to Equation 2, shown below:

$$T = \frac{d}{d+t} \tag{2}$$

where T represents transmission efficiency of the Soller slit device 100, d is the distance between the blades 102 of the Soller slit device 100 and t is the thickness of each blade 102 of the Soller slit device. As with the theoretical divergence defined by Equation 1 above, the transmission efficiency defined in Equation 2 is only theoretical, and may be greatly influenced by manufacturing defects. For example, blades that are not perfectly flat or which bend, or blades that do not properly absorb divergent X-rays, may reduce the overall transmission efficiency of a Soller slit device.

It should be noted with respect to Equations 1 and 2 that material properties do not form a part of these equations. However, both of these equations assume that the materials used for the blades 102 of the Soller slit device 100 provide adequate X-ray absorption, sufficient to prevent divergent X-rays from reflecting, or otherwise passing through the Soller slit device.

To ensure that the blades of Soller slit devices are able to absorb X-rays, the blades have traditionally been made of sheets of heavy or highly absorbing metal. Some metals typically used in the construction of Soller slit devices include molybdenum (Mo) or brass. Although metal sheets can be made extremely thin, the mechanical stability of very thin metal sheets is generally not sufficient for high precision X-ray work. This is because any curling or rumpling of the sheets (which are common occurrences) will reduce the transmission efficiency as defined by Equation 2 above and yield unpredictable divergence.

It can be seen in Equation 2 that as the thickness of each of the blades 102 of the Soller slit device 100 increases, the transmission efficiency decreases. This is due to the fact that more of the X-ray radiation within the acceptable angle of divergence (i.e., nearly parallel to the blades) will be absorbed by the blades' edges. Thus, metal-foil blades for Soller slit devices, which have been made with relatively thick foils (e.g., about 250 μm) produce a low transmission efficiency that diminishes further as the required divergence is reduced. Similar problems exist with metal blades. Although they can be made thin, they cannot be controlled at thicknesses necessary to produce high transmission efficiencies, as defined by Equation 2 above. Additionally, blades constructed of metal typically have lengths on the order of 3 to 4 cm to prevent bending, which increases the theoretical divergence of the device according to Equation 1.

In contrast, a Soller slit device according to the present invention comprises blades that are made from a material having a density less than 6 g/cm$^3$, and more preferably less than 5 g/cm$^3$. Suitable low-density materials that can be used for this purpose include glass, mica, and the like. Advantageously, glass, and the other materials from which the blades 102 of the present invention are made, can be formed in very thin, long sheets that are mechanically rigid. For example, glass can be formed into sheets having a thickness of only about 50 μm, and yet maintain their resistance to bending. As a result, the length of the blades 102 of the Soller slit device 100 can be increased relative to conventional devices. Preferably, the blades are longer than 5 cm, and can be on the order of 12–15 cm, or about four to five times the length of traditional blades made from metals.

Due to the increased length of the blades 102 of the Soller slit device 100, the divergence, as described by Equation 1 above, is significantly reduced. For example, divergences of less than 0.1° are easily obtainable. In accordance with an embodiment of the present invention, a divergence of 0.07° is possible. This provides superior results relative to standard Soller slit devices 100, which have typical divergence angles of 0.2° to 0.8°.

Additionally, because of the thin profile (t) of the blades 102 of the Soller slit device 100 of the present invention, the transmission efficiency is improved, as can be seen from Equation 2 above. For example, a transmission efficiency of greater than 80% is obtainable by way of the present invention. In accordance with an embodiment of the present invention, utilizing glass blades 102, a transmission efficiency of 60% is easily obtained, while traditional Soller slit devices utilizing metal blades typically produce a transmission efficiency of 30% or less.

The term "glass," as used in connection with the embodiments of the present invention, includes materials that are solid whose atoms do not adopt a crystalline lattice, but which nevertheless cannot easily move past one another. Most types of glass used in connection with embodiments of the present invention are based on silica ($SiO_2$), generally found in sand. Ingredients can be added to the silica to lower the softening temperature from about 1200° C. to a more convenient working temperature. Additives that can be added to silica-based glass include sodium ($Na_2O$) and calcium (CaO). Additionally, soda-lime glass, which is commonly used for windows and bottles, and is easily formed and shaped, can be used to form the blades of a Soller slit device. When higher strength at high temperatures, a low coefficient of expansion, or good thermal shock resistance is necessary, Borosilicate glass, such as Pyrex, can be used to form the blades of a Soller slit device.

The thinner profile blade of the present invention effectively increases the spacing (d) between the blades, to improve transmission efficiency. As can be seen with reference to Equation 1 above, when Soller slit devices have relatively large spacings (d) between blades 102, the angle of divergence (Δθ) can be reduced by increasing the length (l) of the blades. The present invention combines both of these characteristics, thereby enhancing the ability to achieve a tight angle of divergence. The longer length, coupled with the thin profile for non-reflecting blades, provide the present invention with its unique properties. As stated above, the divergence of the Soller slit device 100 of the present invention is less than 0.1°, while achieving a transmission efficiency of 60% or better.

The length of the oblique path through a Soller slit blade 102 is given by Equation 3 below:

$$P \geq \frac{t}{\sin(\Delta\theta)} \tag{3}$$

where P represents the oblique path through the blade 102, in essence the effective thickness for low-angle incident X-rays. Thus, for the Soller slit device 100 of the present invention that has a divergence of approximately 0.1° or less, the effective thickness is increased by a factor of approximately 600 compared to the blade thickness (t). Both calculations and experiments have shown that for such Soller slit devices, glass and other low density materials are entirely adequate absorbers of X-ray radiation.

The blades 102 of the Soller slit device 100 should preferably be non-reflective, but the thin glass blades are naturally reflective to most radiation, including high energy radiation, such as X-rays, and EUV radiation. However, this property can be easily modified by applying a non-reflective coating, or by etching the surface of the blades. In coating thin glass blades, a number of metal, which have naturally high roughness, can be evaporated onto the glass surface. Suitable metals that can be used to form a non-reflective coating on glass blades include gold and platinum, among others. In accordance with an embodiment of the present invention, the coating can be formed from Barium Sulphate ($BaSO_4$), which is advantageous as it can be formed into a stable, reliable coating having a thickness of only 10–15 μm. Gold, platinum, tungsten, and Barium Sulphate are advantageous as they are also non-corrosive in the atmosphere, and thus can be used for a long period without need for replacement due to corrosion. Additionally, gold, platinum, and Barium Sulphate are relatively dense materials that add to the absorption capability of each of the blades. However, heavy materials are not required to coat the blades 102 for absorption purposes. Thus, non-reflective coatings could be made of other elements that would suitably prevent reflection of X-rays from the glass blades 102. As an alternative to applying a coating, the surfaces of the glass blades can be etched to reduce reflectivity.

In accordance with an embodiment of the present invention, the Soller slit device 100 can comprise a number of glass blades 102 having a thickness of 70 μm or less, with a surface coating of 0.5–1.0 μm of gold or tungsten. Precision lapped slips of glass can be used as spacers to control the blade separation. The spacing of the glass blades should be precisely maintained to prevent adverse effects upon the divergence or transmission efficiency parameters defined by Equations 1 and 2 above.

Figure 2:
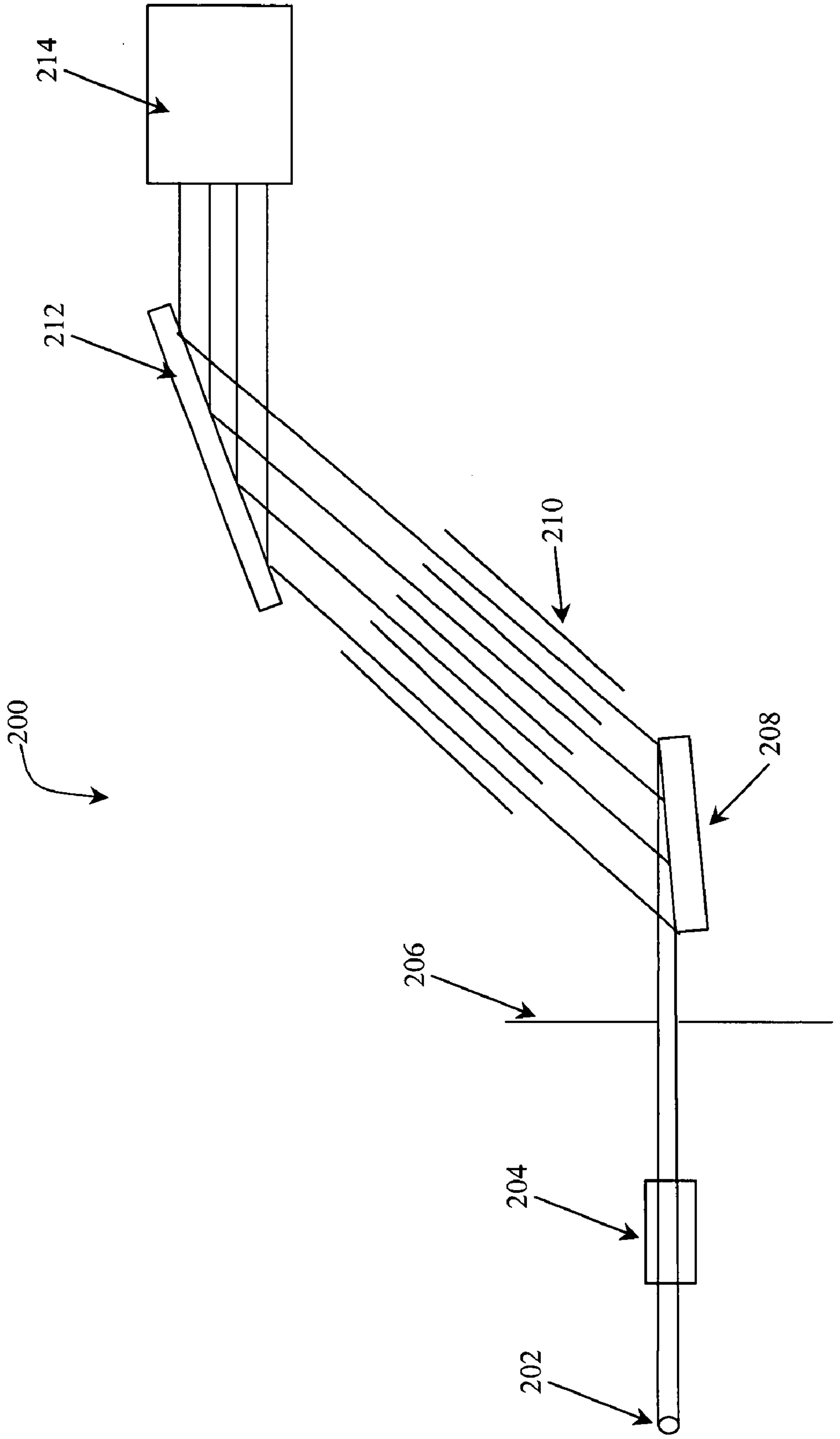
FIG. 2 is a block diagram of an exemplary diffractometry system incorporating the principles of the present invention.

The Soller slit device 100 of the present invention can be used as an optical element in a high energy radiation imaging system, such as an X-ray diffractometry system. FIG. 2 is a schematic diagram of a basic X-ray diffractometry system 200 in which the present invention can be used. Although FIG. 2 relates to an X-ray diffractometry system, the basic setup and components can also be associated with other diffractometry systems using different forms of high energy radiation. Therefore, any discussion of the implementation of the Soller slit collimator within the X-ray diffractometry system of FIG. 2 can also be applied to other high energy radiation diffractometry systems.

The diffractometry system 200 of FIG. 2 utilizes an X-ray line source 202 as a high-energy radiation source, to produce the X-rays that are used to analyze a sample. This source 202 may comprise, for example, a laser beam vaporizing metal foil, such as copper foil, which creates multiply charged ions that emit X-ray radiation. The line source 202 shown in FIG. 2 is perpendicular to the plane of the paper in which FIG. 2 is shown.

X-ray radiation from the source 202 passes through a vertical divergence control unit 204. This vertical divergence control unit 204 is typically a group of axial Soller slits. These Soller slits are parallel to the plane of the paper in which FIG. 2 is shown, and are not low-divergence Soller slits. It will be recognized by those skilled in the art that the Soller slit device of the present invention could be used as the vertical divergence control unit 204. However, as low-divergence is not necessary at this stage, the high quality and low-divergence associated with the Soller slit device of the present invention are not required for the vertical divergence control unit 204.

After emerging from the vertical divergence control unit 204, X-ray radiation passes through incident beam divergence slits 206, which serve as slit apertures. After passing through the incident beam divergence slits 206, the X-ray radiation impinges on the specimen 208. It is this specimen 208 that is being examined by way of the X-ray diffractometry system shown in FIG. 2. The specimen diffracts the incident X-ray radiation, which then passes through a high-energy radiation collimating device 210, e.g., X-ray collimating optics.

In accordance with an embodiment of the present invention, the X-ray collimating optics 210 comprises a Soller slit device having blades made of low density materials. The blades of the Soller slit device 210 are oriented perpendicular to the plane of the drawing of FIG. 2. As described above, the Soller slit device 210 has the advantageous effect of producing low-divergence X-ray radiation with an angle of divergence of 0.1° or less, and with a high transmission efficiency that can be up to approximately 80%.

Once the diffracted X-ray radiation has been collimated by way of the Soller slit device 210, it is then reflected off a monochromator crystal 212 to a device for collecting high-energy radiation, such as a detector 214. The monochromator crystal 212 serves to isolate the desired wavelength of the incident X-rays by diffraction, and can be any suitable monochromator crystal, including graphite, for example. The detector 214 can comprise any detector suitable for detecting X-ray radiation. An embodiment of the present invention, for example, makes use of a scintillation detector.

The present invention, when utilized as the collimating optics 210, exhibits distinct advantages over traditional high energy radiation optics in that it improves both peak width and peak intensity of diffraction patterns produced by a high energy (e.g., X-ray or EUV) diffractometer. First, the present invention provides narrower diffraction peak widths when used in an X-ray diffractometer, which is commercially advantageous. Generally, the width of peaks measured on a diffractometer depends upon two parameters: sample quality and instrument broadening. Sample quality includes such factors as sample disorder, thermal vibration, particle size, strain/stress within the lattice, and the quality of the alignment of the diffracting planes with the crystal lattice. These factors are generally not improved by way of improved X-ray optics. However, instrument broadening is controlled mainly by the X-ray optics, and specifically a Soller slit device such as the present invention, when used within an X-ray diffractometry system. Thus, instrument broadening, which contributes to increased peak width, can be minimized by using an efficient and effective Soller slit.

X-rays are naturally divergent. Diffractometers are designed to guide X-rays from the source into the sample and then into the detector to measure scattered intensities as a function of a scattering angle. The X-ray beam is directed by optical elements, the most basic one being slits, or more sophisticated multi-layer optics, or Soller slits. Thus, the use of X-ray optics can control the beam divergence, but can rarely ever eliminate divergence entirely. The present invention, which provides a small angle of divergence, decreases the overall instrument broadening and thus contributes to a narrower peak width.

The measured peak width of diffraction patterns produced by X-ray diffractometry is a combination of sample quality broadening and instrument broadening. More specifically, the measured peak width is generally a convolution of both broadening effects. Thus, the worse the sample quality and the larger the beam divergence, or instrument broadening, the broader the measured peak becomes. Therefore, instrument broadening essentially sets a lower limit of peak width that theoretically can be measured on a particular instrument. The present invention reduces instrument broadening, thereby approaching the lower limit of peak width that theoretically can be measured by a given diffractometer. Narrow diffraction peak widths are desired to increase resolution of similar constituents of a sample. Thus, by way of the present invention, similar constituents that may not be able to be independently resolved on instruments using optics that produce a greater divergence angle (i.e., instruments with greater instrument broadening) can be independently resolved by way of embodiments of the present invention. That is, by maintaining a narrower peak resolution, embodiments of the present invention are able to obtain more information in a given sample.

The second parameter that contributes to the performance of X-ray diffractometers is peak intensity. In X-ray diffractometry, because of the nature of the X-ray radiation, it is difficult to obtain an increase in peak intensity. As mentioned above, it is typical to analyze a sample over a relatively long period of time to collect a large amount of data from which noise may be subtracted, such as thermal noise, and the like. This technique helps the observed peak intensity to increase. However, if peak intensity is improved, then less time is required to collect adequate measurements of a particular sample. For example, in X-ray diffractometry, an improvement by a factor of two of the peak intensity is extremely important, as peak intensities are low, and generally near the ambient noise floor.

Some of the factors that influence peak intensity include intensity of the primary beam, sample absorption, and efficiency of the X-ray optics. The transmission efficiency of the X-ray optics can be greatly improved by utilizing the Soller slit device 100 of the present invention. For example, the increased transmission efficiency of the Soller slit of the present invention greatly contributes to peak intensity in an X-ray diffractometry application.

Thus, by way of the foregoing, it can be seen that the Soller slit of the present invention provides a tremendous commercial advantage, as it is able to produce narrow and intense diffraction peaks for X-ray diffractometry and similar high energy radiation applications. Specifically, the Soller slit of the present invention, when used as part of the X-ray optics of an X-ray diffractometry system, is able to increase peak intensity and reduce instrument broadening, which consequently narrows measured peak widths. More generally, the present invention provides for a Soller slit device for use with high energy radiation, such as X-ray or EUV radiation that minimizes divergence and increases transmission efficiency.

It will be appreciated by those of ordinary skill in the art that the present invention can be embodied in other specific forms without departing from the spirit or essential characteristics thereof. For example, while an exemplary embodiment of the present invention has been described with reference to a Soller slit for X-ray collimation, the principles of the present invention are applicable to collimation of other radiation that behaves similarly to that of X-rays, such as extreme ultraviolet (EUV) and other types of high energy radiation. Additionally, although the present invention has been described in connection with its use and applicability within an X-ray diffractometry system, it will be appreciated by those skilled in the art that the Soller slit device of the present invention can be usefully employed in any system where collimation of X-rays or other similarly behaving radiation is required and/or desired.

The presently disclosed embodiments are, therefore, considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A device for collimating high energy X-rays comprising:

a plurality of substantially parallel planar blades that are stacked and spaced apart from one another to form a Soller slit having passages for the transmission of X-rays, said blades being constructed from glass sheets each having a thickness less than 250 μm and whose surfaces have a non-reflective treatment to absorb divergent X-rays that are not substantially parallel to said blades.

2. The Soller slit device of claim 1 wherein said device transmits at least 60% of incident high-energy radiation.

3. The Soller slit device of claim 2, wherein the transmission efficiency is in the range of 60–80%.

4. The Soller slit device of claim 1, wherein the length of each blade in the direction of transmission is greater than 5 cm.

5. The Soller slit device of claim 4, wherein the blade length is at least 12cm.

6. The Soller slit device of claim 5, wherein the blade length is in the range of 12–15 cm.

7. The Soller slit device of claim 1, wherein the thickness of each blade is no greater than 70 μm.

8. The Soller slit device of claim 7, wherein the thickness of each blade is approximately 50 μm.

9. The Soller slit device of claim 1, wherein the surface of each of the blades has a coating that is non-reflective to X-rays.

10. The Soller slit device of claim 9, wherein the blades each have a coating of barium sulfate.

11. The Soller slit device of claim 1, wherein the surface of each of the blades is etched to prevent reflection.

12. A system for performing high energy radiation diffractometry, comprising:

a high energy X-ray source;

a high energy radiation collimating device comprising a plurality of substantially parallel planar blades that are stacked and spaced apart from one another to form passages for the transmission of X-rays, said blades being constructed from glass sheets each having a thickness less than 250 μm and whose surfaces have a non-reflective treatment to absorb divergent X-rays from said source that are not substantially parallel to said blades; and a device for collecting X-ray radiation after the X-ray radiation impinges on a sample to be examined.

13. The diffractometry system of claim 12, wherein the high energy radiation collimating device forms a Soller slit device.

14. The diffractometry system of claim 12, wherein the length of each blade in the direction of transmission is greater than 5 cm.

15. The diffractometry system of claim 14, wherein the blade length is at least 12 cm.

16. The diffractometry system of claim 15, the blade length is in the range of 12–15 cm.

17. The diffractometry system of claim 12, wherein the thickness of each blade is no greater than 7μm.

18. The diffractometry system of claim 17, wherein the thickness of each blade is approximately 50 μm.

19. The diffractometry system of claim 12, wherein the surface of each of the blades has a coating that is non-reflective to X-rays.

20. The diffractometry system of claim 19, wherein the blades each have a coating of barium sulfate.

21. The diffractometry system of claim 12, wherein the surface of each of the blades is etched to prevent reflection.

* * * * *